(12) United States Patent
Xu et al.

(10) Patent No.: US 9,444,891 B2
(45) Date of Patent: Sep. 13, 2016

(54) DATA MIGRATION IN A STORAGE NETWORK

(71) Applicant: Empire Technology Development LLC, Wilmington, DE (US)

(72) Inventors: Shijie Xu, Beijing (CN); Qi Li, Beijing (CN); Xuefeng Song, Hebei (CN)

(73) Assignee: Emoire Technology Development LLC, Wilmington, DE (US)

( * ) Notice: Subject to any disclaimer, the term of this patent is extended or adjusted under 35 U.S.C. 154(b) by 285 days.

(21) Appl. No.: 14/363,075

(22) PCT Filed: Jul. 1, 2013

(86) PCT No.: PCT/CN2013/078576
§ 371 (c)(1),
(2) Date: Jun. 5, 2014

(87) PCT Pub. No.: WO2015/000105
PCT Pub. Date: Jan. 8, 2015

(65) Prior Publication Data
US 2016/0182632 A1    Jun. 23, 2016

(51) Int. Cl.
*G06F 15/16*    (2006.01)
*H04L 29/08*    (2006.01)
*H04L 29/06*    (2006.01)

(52) U.S. Cl.
CPC .......... *H04L 67/1097* (2013.01); *H04L 69/14* (2013.01); *H04L 69/28* (2013.01)

(58) Field of Classification Search
USPC .................. 709/219, 250; 370/538, 437, 252
See application file for complete search history.

(56) References Cited

U.S. PATENT DOCUMENTS

| | | | | |
|---|---|---|---|---|
| 4,939,723 A * | 7/1990 | Harley, Jr. | ................ | H04J 3/22 370/538 |
| 5,551,066 A | 8/1996 | Stillman et al. | | |
| 6,222,832 B1 * | 4/2001 | Proctor | ................ | H04B 1/7075 370/335 |
| 8,165,152 B2 * | 4/2012 | Sammour | ............... | H04L 47/10 370/437 |
| 2002/0091863 A1 * | 7/2002 | Schug | ..................... | H04L 49/90 709/250 |
| 2003/0069981 A1 | 4/2003 | Trovato | | |
| 2008/0075033 A1 * | 3/2008 | Shattil | .................... | H04B 7/026 370/328 |
| 2015/0023202 A1 * | 1/2015 | Shattil | ..................... | H04L 45/24 370/252 |

FOREIGN PATENT DOCUMENTS

| | | |
|---|---|---|
| CN | 102170440 A | 8/2011 |
| CN | 102857338 A | 1/2013 |
| CN | 202663444 U | 1/2013 |
| EP | 2028592 A1 | 2/2009 |

OTHER PUBLICATIONS

"Side channel attack," Wikipedia, accessed at http://web.archive.org/web/20130614043644/https://en.wikipedia.org/wiki/Side_channel_attack, last modified on May 30, 3013, pp. 1-6.

(Continued)

*Primary Examiner* — Tammy Nguyen
(74) *Attorney, Agent, or Firm* — Brundidge & Stanger, P.C.

(57) ABSTRACT

In one example, a method may include assigning a time requirement for a transmission of data from a first data storage node to a second data storage node, assigning a maximum channel transmission rate for each of a maximum number of available transmission channels based on predetermined parameters of a transmission channel, and transmitting the data in accordance with the time requirement and the maximum number of available transmission channels.

19 Claims, 6 Drawing Sheets

(56) References Cited

OTHER PUBLICATIONS

Keromytis, A.D., et al., "The MEERKATS Cloud Security Architecture," 32nd International Conference on Distributed Computing Systems Workshops, pp. 446-450 (2012).

Okhravi, H., et al., "Creating a Cyber Moving Target for Critical Infrastructure Applications," Chapter 8, Critical Infrastructure Protection V IFIP Advances in Information and Communication Technology, vol. 367, pp. 107-125 (2011).

International Search Report with Written Opinion for International Application No. PCT/CN2013/078576 mailed on Mar. 27, 2014.

* cited by examiner

DATA MIGRATION IN A STORAGE NETWORK

PRIORITY INFORMATION:

The present application is a U.S. national stage filing under 35 U.S.C. §371 of International Application No. PCT/CN2013/078576, filed on Jul. 1, 2013.

TECHNICAL FIELD

The embodiments described herein pertain generally to data migration in a storage network.

BACKGROUND

Unless otherwise indicated herein, the approaches described in this section are not prior art to the claims in this application and are not admitted to be prior art by inclusion in this section.

Storage networks typically include data centers having data storage nodes for storing data. A data center for a web-based application, for example, may include multiple distributed data storage nodes that each has a number of storage servers. The transmission of mass data may occupy a large amount of network bandwidth and may affect the performance of other applications deployed on the same physical server. Further, when a large amount of network bandwidth is occupied, the data may be collected and analyzed by a malicious object in a same zone in an attempt to launch a side channel attack.

SUMMARY

Technologies are generally described for data migration in a storage network. The various techniques may be implemented in various systems, methods, and/or computer-readable mediums.

In one example embodiment, a method is provided that may include assigning a time requirement for a transmission of data from a first data storage node to a second data storage node, assigning a maximum channel transmission rate for each of a maximum number of available transmission channels based on predetermined parameters of a transmission channel, and transmitting the data in accordance with the time requirement and the maximum number of available transmission channels.

In another example embodiment, a computer-readable medium stores instructions that, when executed, cause one or more processors to perform operations that may comprise assigning a time requirement for a transmission of data from a first data storage node to a second data storage node, assigning a maximum channel transmission rate for each of a maximum number of available transmission channels based on predetermined parameters of a transmission channel, and transmitting the data in accordance with the time requirement and the maximum number of available transmission channels.

In yet another example embodiment, a data storage system may include a plurality of data storage nodes including a first data storage node and a second data storage node configured to respectively store data; and a processor configured to assign a time requirement for a transmission of data from the first data storage node to the second data storage node, assign a maximum channel transmission rate for each of a maximum number of available transmission channels based on predetermined parameters, and transmit the data in accordance with the time requirement and the maximum number of available transmission channels.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Technology is described for performing data migration, i.e., relocation, in a storage network. In various embodiments, the technology randomizes data transmission between data storage nodes over different transmission channels in time. The randomizing of the data transmission may be accomplished by randomly selecting transmission channels for transmitting data between the data storage nodes.

Figure 1:
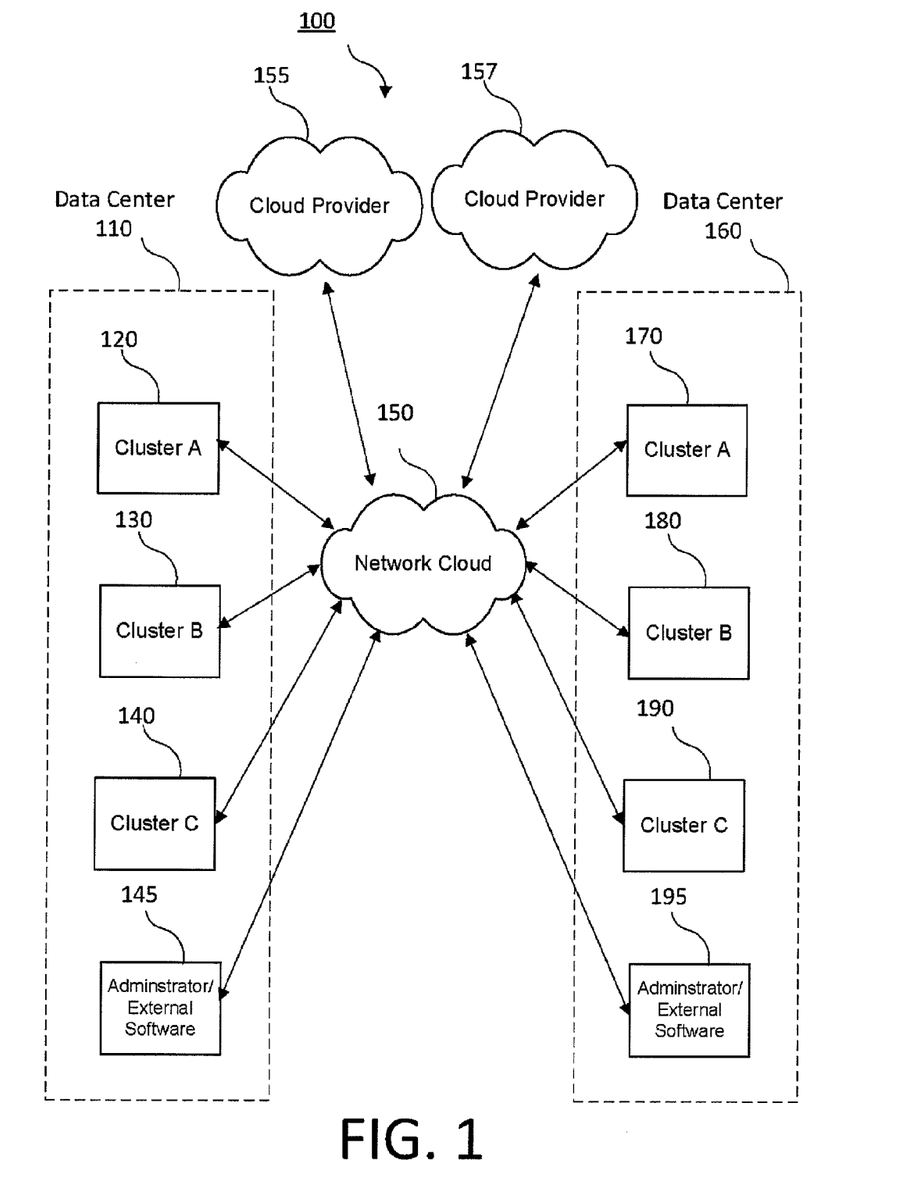
FIG. 1 shows an example configuration of a storage network in which data migration in a storage network may be implemented, arranged in accordance with at least some embodiments described herein.

FIG. 1 shows an example configuration 100 of a storage network in which data migration in a storage network may be implemented, arranged in accordance with at least some embodiments described herein. As depicted, example configuration 100 of a storage network may include, at least, a data center 110 that may include one or more clusters 120, 130, and 140, and an administrator 145 associated therewith; a network cloud 150; one or more cloud providers 155 and 157; and a data center 160 that may include one or more clusters 170, 180 and 190, and an administrator 195 associated therewith.

As set forth herein, transmission of data may be facilitated within a cloud storage environment.

As referenced herein, "cluster" may refer to a group of data storage nodes, e.g., servers, which may be communicatively coupled to each other. According to some embodiments, data center 110 and data center 160 may each include multiple clusters that may be in communication with each other, both internal and external to the respective data center, to thereby implement data migration as set forth herein.

The data storage nodes, e.g., servers, may each include a processor for facilitating data migration. In accordance with one or more example embodiments, data migration may be implemented in accordance with a time requirement as assigned by a processor of a transmitting data storage node or a receiving data storage node, at a rate up to a maximum transmission rate on available transmission channels as determined by the aforementioned processor. The maximum transmission rate may be determined based on predetermined parameters such as a length or type of transmission channel.

Data centers 110 and 160 may each refer to a commonly located collection of data storage nodes, e.g., servers, which may be configured, designed, and/or programmed to receive data from data storage nodes within data centers 110 and 160 or from data storage nodes within other data centers, via a communication link, and to store the received data therein. In accordance with some embodiments of configuration 100, data centers 110, 160, etc., may be referred to as "server farms." Data centers 110, 160, etc., may organize data storage nodes, e.g., servers, in a commonly located cluster format to allow for efficient large scale deployment to manage one or more common data services.

Clusters 120, 130, and 140 may each include one or more data storage nodes, e.g., servers, which may be configured to store data that is received at data center 110. For example, clusters 120, 130, and 140 may store data for executing one or more applications (e.g., email). Clusters 170, 180, and 190, may each be similarly configured to include one or more data storage nodes to store data that is received at data center 160.

Administrator 145 may be included in the data center 110 and may be configured, designed, and/or programmed to provide executable instructions to one or more of clusters 120, 130 and 140 respectively. Administrator 145 may further be configured to include a user input device configured to enable a user to provide executable instructions to one or more of clusters 120, 130 and 140 and to view cluster-related information.

Further, administrator 145 may include software or computer-executable instructions that are configured, designed, and/or programmed to request data migration, i.e., relocation, between data storage nodes, e.g., servers, within the respective data center 110 to thereby backup user data and/or application data; to request data migration between data storage nodes to and/or from another data center, e.g., data center 160; and also to monitor actuation of any requested data migration to thereby confirm completion of the data migration process.

Administrator 195 may be included in data center 160 and may be similarly configured, designed and/or programmed to provide executable instructions to one or more of clusters 170, 180 and 190 respectively. Further, Administrator 195 may be configured to include a user input device configured to enable a user to provide executable instructions to one or more of clusters 170, 180 and 190 and to view cluster-related information.

Further, administrator 195 may further include software or computer-implemented instructions that are configured, designed, and/or programmed to request data migration, i.e., relocation, between data storage nodes, e.g., servers, within the respective data center 160 to thereby backup user data and/or application data; to request data migration between data storage nodes to and/or from another data center, e.g., data center 110; and also to monitor actuation of any requested data migration to thereby confirm completion of the data migration process.

Network cloud 150 may refer to a network on which at least portions of data migration may be implemented. Network cloud 150 may be implemented by any one of, e.g., a wide area network (WAN) (e.g., Internet), a local area network (LAN), or any type of network suitable for performing data migration.

Cloud provider 155 may refer to a vendor or third party cloud service provider that is configured to facilitate various computing services that utilize the data storage nodes, e.g., servers, respectively corresponding to clusters 120, 130 and 140 of data center 110. Cloud provider 155 may also be configured to facilitate various computing services that utilize the data storage nodes, e.g., servers, respectively corresponding to clusters 170, 180 and 190 of data center 160. Examples of such computing services may include e.g., business applications accessed via a web-browser at a computer device, while associated data may be stored on the data storage nodes of clusters within a data center, and allocating bandwidth for implementation of the business applications. Further, in some cases, cloud provider 155 may be configured, designed, and/or programmed to implement failure detection capabilities, e.g., providing alternative services when a computing service is detected to not be operating properly.

Cloud provider 157 may refer to another vendor or third party cloud service provider that may similarly be configured to facilitate various computing services that utilize the data storage nodes, e.g., servers, respectively corresponding to clusters 120, 130 and 140 of data center 110. Cloud provider 157 may also be configured to facilitate various computing services that utilize the data storage nodes, e.g., servers, respectively corresponding to clusters 170, 180 and 190 of data center 160.

According to some embodiments, cloud provider 155 may also be configured to facilitate various computing services that utilize the data storage nodes, e.g., servers, respectively corresponding to clusters 120, 130 and 140 of data center 110, while cloud provider 157 may be configured to facilitate various computing services that utilize the data storage nodes, e.g., servers, respectively corresponding to clusters 170, 180 and 190 of data center 160, or vice versa.

Cloud provider 155 may be further configured to manage the infrastructure and platforms for running the one or more applications at a computing device, e.g., a personal computer.

Cloud provider 157 may be similarly configured to manage the infrastructure and platforms for running the one or more applications on a computing device using the associated application data stored on the data storage nodes, e.g., servers, of one or more clusters 120, 130, 140, 170, 180 and 190.

Figure 2:
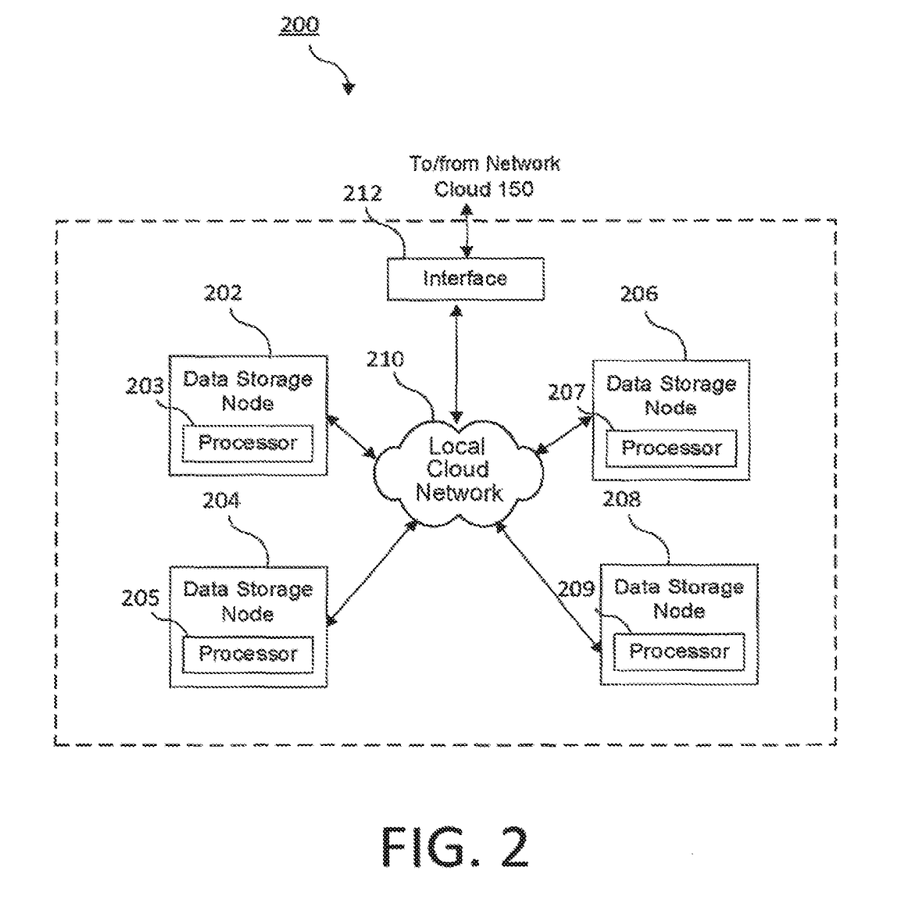
FIG. 2 shows an example configuration of a cluster of a data center in which at least portions of data migration in a storage network may be implemented, arranged in accordance with at least some embodiments described herein.

FIG. 2 shows an example configuration 200 of a cluster of a data center in which at least portions of data migration in a storage network may be implemented, arranged in accordance with at least some embodiments described herein. The cluster may be any one of clusters 120, 130, 140, 170, 180, and 190. As depicted, example configuration 200 may include, at least, one or more data storage nodes 202, 204, 206 and 208, each of which may include at least one processor 203, 205, 207 and 209, respectively; a local cloud network 210; and an interface 212. However, this configuration is an example only, and is not intended to be limiting in any manner, e.g., quantity of data storage nodes per cluster, or even quantity of processors per data storage node.

Each data storage node 202, 204, 206 and 208 may refer to at least one device, e.g., a server, which may be configured to receive and to store data therein.

Each data storage node 202, 204, 206 and 208 may be assigned a unique network address, e.g., an IP address, which may be an external network address or a local network address, in accordance with known network protocols. Data storage nodes 202, 204, 206, 208 corresponding to a respective cluster may be configured, designed, and/or programmed to be communicatively coupled to each other as well as to other data storage nodes corresponding to other clusters.

Each processor 203, 205, 207 and 209, corresponding to a respective data storage node, may be a microcontroller that may be configured to perform tasks, to process data, and/or to control the functionality of the respective data storage nodes 202, 204, 206 and 208. Each processor 203, 205, 207 and 209 may further be configured, designed, and/or programmed to process signals received from one or more data storage nodes corresponding to one or more other clusters and to provide instructions to migrate data based on the received signals. For example, according to one or more embodiments, each processor 203, 205, 207 and 209 may be configured assign a time requirement for the migration of data between the data storage nodes, to determine available transmission channels and to assign a maximum transmission rate of the available transmission rates based on predetermined parameters such as a length or type of the transmission channel. Further, each processor 203, 205, 207 and 209 may be configured to calculate or determine fixed transmission channels for the migration of data. The number of fixed transmission channels calculated may indicate the number of transmission channels to be utilized to perform the transmission of data. Each processor 203, 205, 207 and 209 may also be configured to select random transmission channels to be used to transmit any detected remaining data, i.e., data yet to be migrated, after initiating the migration of data using the fixed transmission channels. Thus, each processor 203, 205, 207 and 209 may be further configured, designed, and/or programmed to facilitate data migration from a respectively corresponding data storage node, e.g., data storage node 202, to another data storage node, e.g., data storage node 206, within a common cluster or to one or more data storage nodes corresponding to one or more other clusters.

In one or more embodiments, local cloud network 210 may be provided to facilitate communication between data storage nodes 202, 204, 206 and 208 within a common cluster 200. Local cloud network 210 may be similarly implemented by any one of, e.g., a wide area network (WAN) (e.g., Internet), a local area network (LAN), or any type of network suitable for performing data migration. In one or more other embodiments, network cloud 150 may facilitate communication between data storage nodes 202, 204, 206 and 208 using interface 212.

Interface 212 may refer to a network interface that may be configured, designed, and/or programmed to facilitate communication between one or more of data storage nodes 202, 204, 206, and 208 with other clusters and/or cloud providers 155 and 157, via network cloud 150. Alternatively, each data storage node 202, 204, 206 and 208 may include an associated embodiment of external network interface 212 to facilitate communication with other data storage nodes within a common cluster or one or more different clusters.

Figure 3:
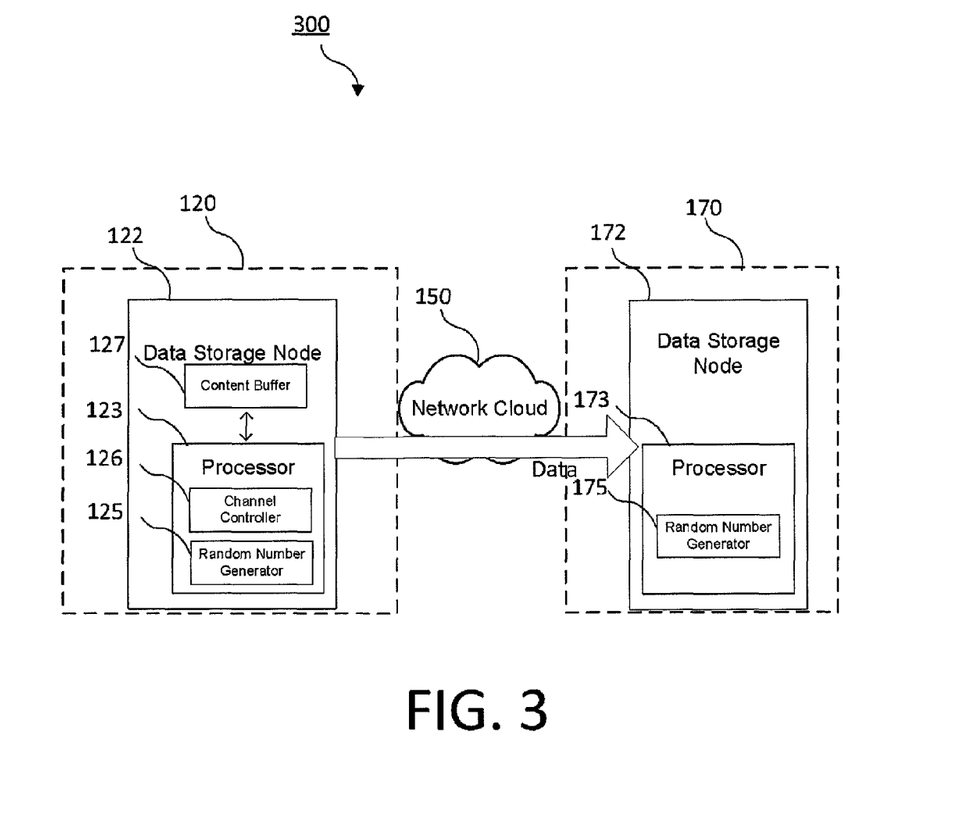
FIG. 3 shows an example configuration of a first data storage node and a second data storage node between which at least portions of data migration in a storage network may be implemented, arranged in accordance with at least some embodiments described herein.

FIG. 3 shows an example configuration of a first data storage node and a second data storage node between which at least portions of data migration in a storage network may be implemented, arranged in accordance with at least some embodiments described herein. Example configuration 300 depicts a data storage node 122, i.e., a first data storage node, corresponding to cluster 120, that may include a processor 123, and a random number generator 125 and a channel controller 126; a content buffer 127 may be provided in communication with the processor 123; and a data storage node 172, i.e., a second data storage node, that may include a processor 173 and a random number generator 175. However, this configuration is an example only, and is not intended to be limiting in any manner. Data migration between data storage node 122, i.e., the first data storage, and data storage node 172, i.e., the second data storage node, will be described herein.

According to some embodiments, data storage node 122 and data storage node 172 may be hosted by a common, i.e., the same, cloud provider 155 or 157. Alternatively, data storage nodes 122 and 172 may each be hosted by a different one of cloud providers 155 and 157.

Data storage nodes 122 and 172 may each be configured to respectively store data received from other data storage nodes, which may be included in a common cluster, in a cluster in a common data center, or in another cluster corresponding to another data center. In one or more embodiments, processors 123 and 173 may be configured to independently assign a time requirement for a transmission of data from the respective data storage node 122 and 172 to the other data storage node 122 or 172. For example, processor 123 may be configured, designed, and/or programmed to assign a time requirement to transmit data from data storage node 122 to data storage node 172. Processor 123 may assign the time requirement based on, e.g., the amount of data to be transmitted. The time requirement may be assigned and stored in the respective data storage node and used when performing data transmission to monitor the timing thereof.

Further, processor 123 may be configured to determine a maximum number of available transmission channels to use in transmitting data between the data storage node 122 and data storage node 172. Processor 123 may determine the maximum number of available transmission channels based on the amount of data to be migrated from data storage node 122 to data storage node 172. Further, the maximum number of available transmission channels may be determined based on the amount of transmission channels that are not in use at the time of data migration from data storage node 122 to data storage node 172.

As described herein, "time requirement" may refer to a maximum amount of time that may be allotted to complete the data migration from data storage node 122 to data storage node 172. If data migration is not completed within the allotted time, the process may be terminated and/or the data migration process may be re-set.

Processor 123 may be further configured to assign a maximum channel transmission rate for each of the available transmission channels, upon determining the maximum number of transmission channels to be utilized to transmit data from one data storage node to another, based on predetermined parameters of each of the available transmission channels. According to one or more embodiments, the predetermined parameters may include fixed values based on the physical properties of the respective available channels or other factors that are not subject to adjustment, e.g., a length or type of the transmission channel. Data may then be transmitted from data storage node 122 to data storage node 172 at rates up to the maximum channel transmission rate for each of the respective transmission channels, in accordance with the time requirement.

Data transmission between the data storage node 122 and data storage node 172 may be facilitated based on a number of fixed transmission channels and a number of random transmission channels. Processor 123 may be configured, designed, and/or programmed to calculate a number of fixed transmission channels of the available transmission channels to facilitate the transmitting between data storage node 122 and data storage node 172. The transmission of data from data storage node 122 to data storage node 172 may be initiated through the fixed transmission channels. Processor 123 may be further configured to detect any remaining data in data storage node 122 to be transmitted to data storage node 172, after initiating of transmission of data via fixed transmission channels. Processor 123 may be configured, designed, and/or programmed to randomly select a number of random transmission channels of the available transmission channels to transmit any detected remaining data. The remaining data to be transmitted by the random transmission channels are poured into content buffer 127. The detection of any remaining data is performed by processor 124 using content buffer 127, for example. During each iteration of the random transmission, channel controller 126 of processor 124 may query whether content buffer 127 is empty. If channel controller 126 determines that content buffer 124 is empty then channel controller 126 may send a request for any remaining data from data storage node 122.

Random number generator 125 may be provided in processor 123 of data storage node 122, and configured to randomly select the number of random transmission channels on which the remaining data may be transmitted.

Random number generator 175 may be similarly provided in processor 173 of data storage node 172 and configured to randomly select the number of random transmission channels on which the remaining data may be transmitted.

Thus, FIG. 3 shows an example configuration 300 of data migration between a first data storage node and a second data storage node.

Figure 4:
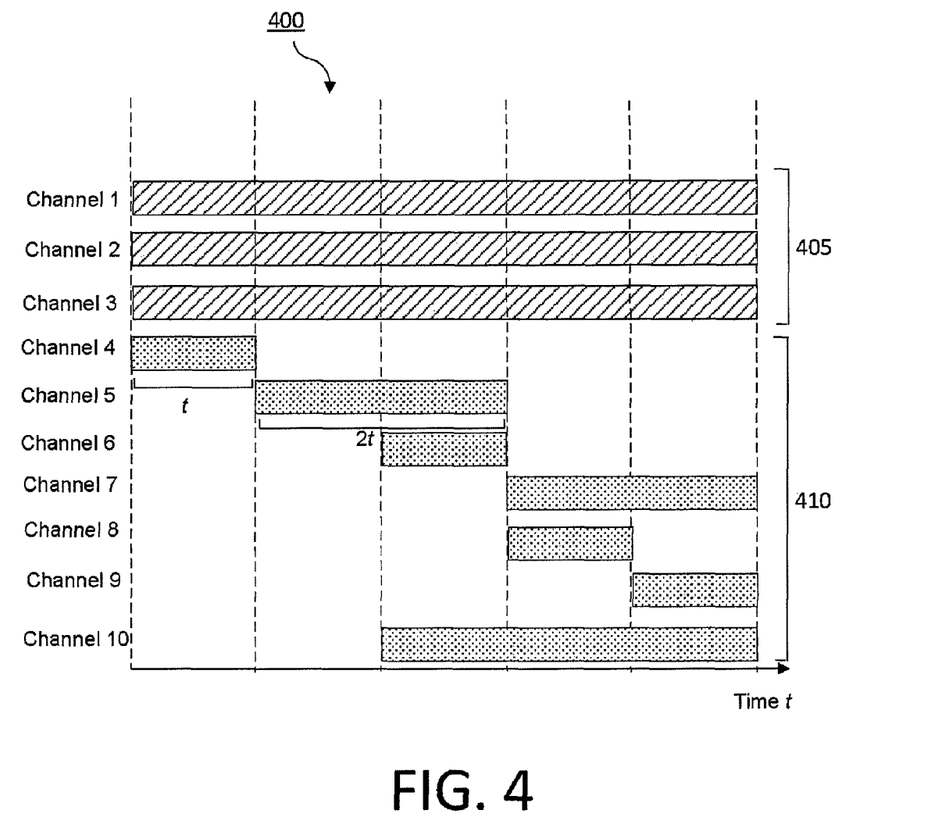
FIG. 4 shows an example configuration of fixed transmission channels and random transmission channels in accordance with some embodiments of data migration in a storage network, as described herein.

FIG. 4 shows an example configuration of fixed transmission channels and random transmission channels in accordance with some embodiments of data migration in a storage network, as described herein. As depicted in FIG. 4, fixed transmission channels 405 may include channels 1, 2, and 3; and random transmission channels 410 may include channels 4, 5, 6, 7, 8, 9 and 10. The transmission, or migration, of data described with regard to FIG. 4 is described herein with reference to features depicted and described with regard to FIG. 3, although such description is not to be interpreted as limiting of the example embodiments.

Data migration between data storage node 122 of cluster 120 and data storage node 172 of cluster 170 may be performed in accordance with the various embodiments described herein. According to some embodiments, processor 123 of data storage node 122 may calculate a number of fixed transmission channels 405, e.g., channels 1 through 3, of available transmission channels provided in the data storage system 100, to facilitate data migration between data storage node 122, i.e., the sending data storage node, and data storage node 172, i.e., the receiving data storage node. The migration of data from data storage node 122 to data storage node 172 may be initiated through fixed transmission channels 405. According to one or more embodiments, the fixed transmission channels 405 may transmit data corresponding to the applications running on data storage node, e.g., a server. When processor 123 determines that there is data remaining in data storage node 122 to be transmitted to data storage node 172, after initiating of transmission of data via fixed transmission channels 405, processor 123 may randomly select a number of random transmission channels 410 of the available transmission channels to transmit the remaining data to data storage node 172.

Processor 123 may perform the random selection of random transmission channels 410 using random number generator 125. Processor 123 may be further configured to transmit the detected remaining data using at least one of the randomly selected transmission channels 410, e.g., random transmission channel 4. According to some embodiments, processor 123 may further be configured to set up the random transmission channels 410. For example, the random transmission channels 410 may be set up by assigning a life cycle to each of the randomly selected ones of the random transmission channels 410. The life cycle of a random channel may be pre-defined as a random value. Alternatively, the life cycle of the random channel may be determined based on the amount of remaining data found in the content buffer. If no remaining data is found in the content buffer, then the life cycle of the random channel may be terminated and the random channel closed. Further, random transmission channel 4 may have a life cycle of one time interval t, while random transmission channel 5 may have a life cycle of two time intervals 2t. The life cycle of each random transmission channel 410 may range between about 20% to about 80% of a corresponding channel capacity of respective random transmission channel 410. Processor 123 may be configured to release, i.e., discontinue use thereof, the at least one random transmission channel 410, e.g., random transmission channel 4, after expiration of the life cycle thereof or after completion of transmission of the remaining data.

Processor 123 may be further configured to select another random transmission channel 410, e.g., one of the random transmission channels 5 through 10, to complete transmission of the detected remaining data upon expiration of the life cycle of the at least one random transmission channel 4. The establishment and release of the transmission channels may be performed via processor 123 or 173 of either data storage node 122 or 172. That is, according to one or more embodiments, either the sending data storage node or receiving data storage node may setup or release random transmission channels 410.

Thus, FIG. 4 shows an example configuration 400 of fixed transmission channels 405 and random transmission channels 410 in which data migration may be implemented.

Figure 5:
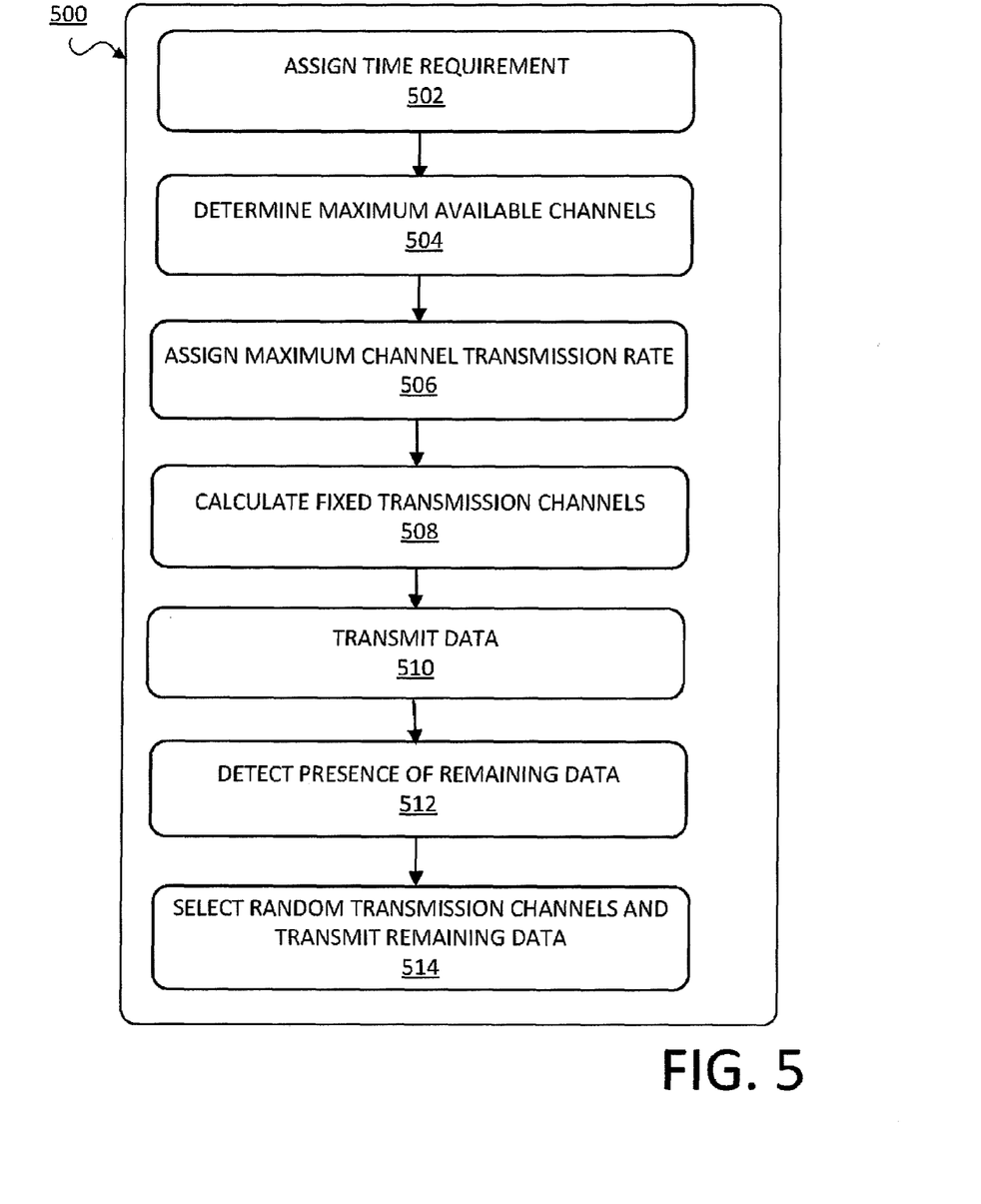
FIG. 5 shows an example configuration of a processing flow of operations for data migration in a data storage network, in accordance with at least some embodiments described herein.

FIG. 5 shows an example configuration of a processing flow of operations for data migration in a data storage network, in accordance with at least some embodiments described herein. As depicted, processing flow 500 may include sub-processes executed by various components that may be part of a data storage node of one or more of clusters 120, 130, 140, 170, 180 or 190, e.g., data storage node 122 of cluster 120 or data storage node 172 of cluster 170 as depicted and described with regard to FIG. 3. However, processing flow 500 is not limited to such components, as modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, 506, 508, 510 and/or 512. Processing flow 500 may begin at block 502.

Block 502 (Assign Time Requirement) may refer to a processor of a data storage node, e.g., processor 123 of data storage node 122, assigning a time requirement for transmission of data from respective data storage node 122 to another data storage node, e.g., data storage node 172. The time requirement to be assigned may be a maximum amount of time allotted to complete the migration of data from data storage node 122 to data storage node 172, based on the amount of data to be migrated. The time requirement may be assigned and stored in data storage node 122 for use in monitoring the timing of the transmission of data between the data storage nodes. Processing flow 500 may proceed from block 502 to block 504.

Block 504 (Determine Maximum Available Channels) may refer to processor 123 determining a maximum number of available channels for completing the data migration between the data storage node 122 and the data storage node 172. According to one or more embodiments, the determination may be made based on the amount of data to be migrated or based on the number of transmission channels not being used for migrated data between other data storage nodes within the storage network 100. Processing flow 500 may proceed from block 504 to block 506.

Block 506 (Assign Maximum Channel Transmission Rate) may refer to processor 123 assigning a maximum channel transmission rate for each of the available transmission channels based on predetermined parameters of a transmission channel. The predetermined parameters may include fixed values based on physical properties of the channel or some other factors that are not subject to adjustment. For example, the predetermined parameters may include a length or type of the available transmission channels. Processing flow 500 may continue from block 506 to block 508.

Block 508 (Calculate Fixed Transmission Channels) may refer to processor 123, for example, calculating a number of fixed transmission channels 405 of the available transmission channels to facilitate data migration from data storage node 122 to data storage node 172. The calculation may be based on the amount of data to be migrated divided by a transmission rate of each transmission channel. The number of fixed transmission channels 405 calculated may indicate the number of transmission channels required to migrate the data between data storage node 122 and data storage node 172. Processing flow 500 may continue from block 508 to block 510.

Block 510 (Transmit Data) may refer to an initiation of transmission of data by processor 123, from data storage node 122 to data storage node 172 via fixed transmission channels 405 of the available transmission channels. Processing flow 500 may continue from block 508 to block 510.

Block 512 (Detect Presence of Remaining Data) may refer to processor 123 detecting the presence of data remaining in data storage node 122 that has yet to be transmitted to data storage node 172, after initiating of transmission of data via fixed transmission channels 405. Processing flow 500 may continue from block 512 to block 514.

Block 514 (Select Random Transmission Channels and Transmit Remaining Data) may refer to processor 123 randomly selecting a number of random transmission channels 410 of the available transmission channels to transmit the detected remaining data, and transmitting the detected remaining data using at least one random transmission channel 410. Random selection of the number of random transmission channels 410 may be facilitated by a random number generator 125. The processor 123 may further be configured to assign a life cycle to each of the randomly selected ones of the random transmission channels 410 such that each random transmission channel is released after expiration of the life cycle thereof or after completion of transmission of the remaining data. The total number of random transmission channels 410 selected and the amount of time for completing migration of data between the data storage node 122 and the data storage node 172 using the fixed transmission channels 405 and the random transmission channels 410 is required to be equal to the time requirement as assigned by processor 123.

Thus, FIG. 5 shows an example processing flow executed by a processor of a data storage node.

Figure 6:
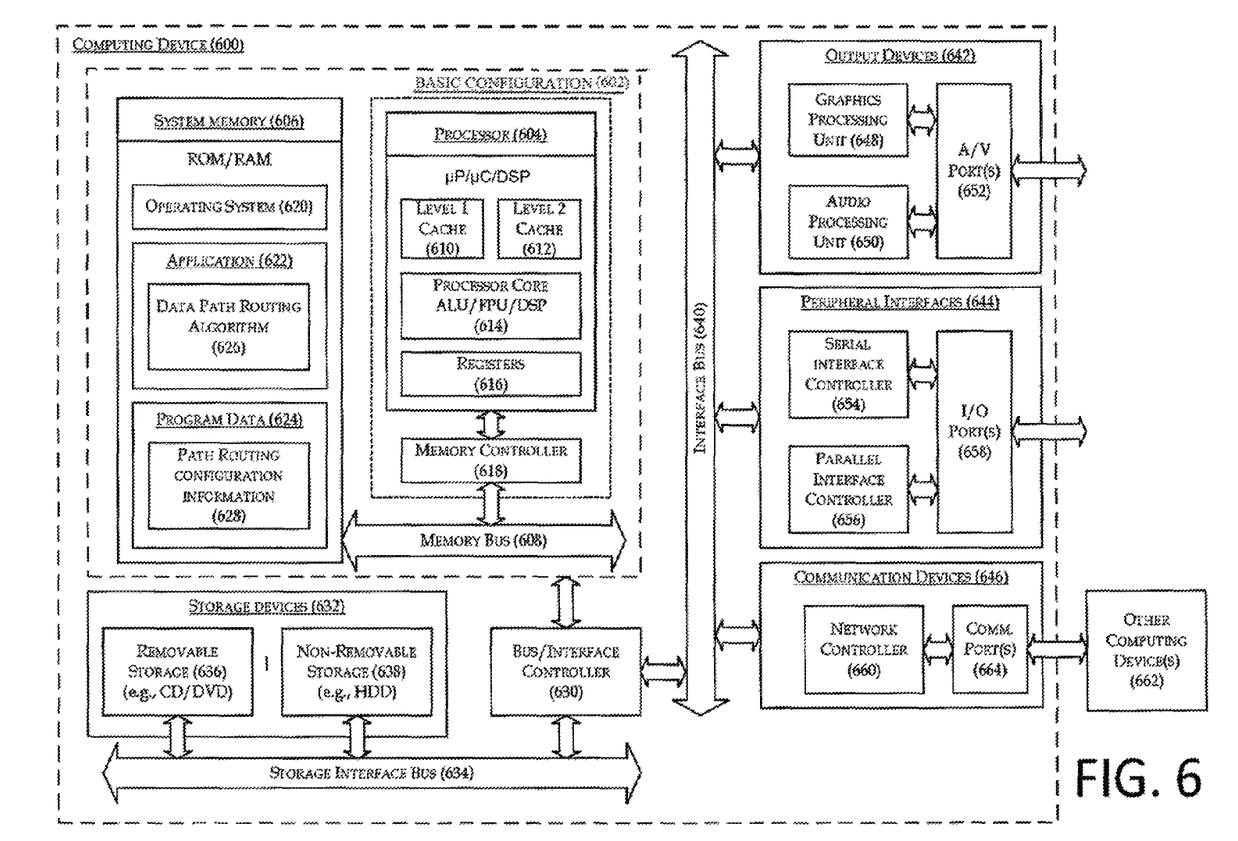
FIG. 6 is a block diagram illustrating an example computing device that is arranged for data migration in a storage network in accordance with the present disclosure.

FIG. 6 is a block diagram illustrating an example computing device 600 that is arranged for data migration in a storage network in accordance with the present disclosure. Computing device 600 may be representative of at least one of a computing device at a user end for accessing cloud computing services; a computing device at a cloud provider e.g., cloud provider 155 or 157 depicted in FIG. 1; or at least one or more elements e.g., a processor of computing device 600 may be employed within a data storage node e.g., data storage node 122 of cluster 120 as depicted in FIG. 3. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604. Processor 604 may refer to a processor of each data storage node e.g., processor 123 of data storage node 122 as depicted in FIG. 3.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include data path routing algorithm 626 that is arranged to perform the data migration between data storage nodes e.g., data storage nodes 122 and 172 in the storage network 100 as depicted in FIG. 3. Program data 624 may include path routing configuration information 628 that may be useful for configuring data path routing algorithm 626 as is described herein. In some embodiments, application 622 may be arranged to operate with program data 624 on operating system 620 such that such that implementations of robust multipath data routing between data storage nodes e.g., data storage nodes 122 and 172 may be provided as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 938 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices, e.g., keyboard, mouse, pen, voice input device, touch input device, etc., or other peripheral devices, e.g., printer, scanner, etc., via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method, comprising:
assigning a time requirement for a transmission of data from a first data storage node to a second data storage node;
assigning a maximum channel transmission rate for each of a maximum number of available transmission channels based on predetermined parameters of a transmission channel; and
transmitting the data in accordance with the time requirement and the maximum number of available transmission channels, wherein the transmitting comprises:
calculating a number of fixed transmission channels of the available transmission channels to facilitate the transmitting,
initiating the transmission of data from the first data storage node to the second data storage node through the fixed transmission channels,
detecting a presence of remaining data in the first data storage node to be transmitted to the second data storage node,
randomly selecting a number of random transmission channels of the available transmission channels to transmit the remaining data, and
transmitting the remaining data to the second data storage node via one or more of the randomly selected random transmission channels; wherein the transmitting comprises:
calculating a number of fixed transmission channels of the available transmission channels to facilitate the transmitting;
initiating the transmission of data from the first data storage node to the second data storage node through the fixed transmission channels;
detecting a presence of remaining data in the first data storage node to be transmitted to the second data storage node;
randomly selecting a number of random transmission channels of the available transmission channels to transmit the remaining data; and
transmitting the remaining data to the second data storage node via one or more of the randomly selected random transmission channels.

2. The method of claim 1, wherein the first data storage node and the second data storage node are hosted by a same storage provider.

3. The method of claim 1, wherein the first data storage node and the second data storage node are hosted by different storage providers.

4. The method of claim 1, wherein the transmitting is facilitated within a cloud storage environment.

5. The method of claim 1, wherein the number of the fixed transmission channels is determined based on a size of data and the maximum channel transmission rate.

6. The method of claim 5, wherein the number of fixed transmission channels indicates a minimum number of transmission channels through which the data may be transmitted from the first data storage node to the second data storage node.

7. The method of claim 1, wherein the number of random transmission channels is a number less than the maximum number of transmission channels minus the number of fixed transmission channels.

8. The method of claim 1, wherein randomly selecting comprises:
assigning a life cycle to each of the randomly selected ones of the random transmission channels.

9. The method of claim 8, wherein the life cycle of each random transmission channel is determined to be less than or equal to a predetermined maximum life cycle of a transmission channel.

10. The method of claim 8, wherein the life cycle of each random transmission channel ranges between 20% to 80% of a corresponding channel capacity of each random transmission channel.

11. The method of claim 8, further comprising:
releasing the at least one random transmission channel of the random transmission channels after expiration of the life cycle thereof, or after completion of transmission of the remaining data.

12. The method of claim 11, further comprising:
selecting another random transmission channel for completing the data transmission upon expiration of the life cycle of the at least one random transmission channel, when there is remaining data to be transferred.

13. A non-transitory computer-readable medium storing instructions that, when executed, cause one or more processors to perform operations comprising:
assigning a time requirement for a transmission of data from a first data storage node to a second data storage node;
assigning a maximum channel transmission rate for each of a maximum number of available transmission channels based on predetermined parameters of a transmission channel; and
transmitting the data in accordance with the time requirement and the maximum number of available transmission channels, wherein randomizing the data transmission comprises:
calculating a number of fixed transmission channels of the available transmission channels to facilitate the transmitting,
initiating the transmission of data from the data first storage node to the second data storage node through the fixed transmission channels,
detecting a presence of remaining data in the first data storage node to be transmitted to the second data storage node,
randomly selecting a number of random transmission channels of the available transmission channels to transmit the remaining data, and
transmitting the remaining data to the second data storage node via one or more of the randomly selected random transmission channels; wherein randomizing the data transmission comprises:
calculating a number of fixed transmission channels of the available transmission channels to facilitate the transmitting;
initiating the transmission of data from the data first storage node to the second data storage node through the fixed transmission channels;
detecting a presence of remaining data in the first data storage node to be transmitted to the second data storage node;
randomly selecting a number of random transmission channels of the available transmission channels to transmit the remaining data; and
transmitting the remaining data to the second data storage node via one or more of the randomly selected random transmission channels.

14. The non-transitory computer-readable medium of claim 13, wherein randomly selecting comprises:
assigning a life cycle to each of the randomly selected ones of the random transmission channels.

15. A data storage system, comprising:
a plurality of data storage nodes including a first data storage node and a second data storage node configured to respectively store data; and
a processor configured to:
assign a time requirement for a transmission of data from the first data storage node to the second data storage node,
assign a maximum channel transmission rate for each of a maximum number of available transmission channels based on predetermined parameters,
transmit the data in accordance with the time requirement and the maximum number of available transmission channels;
calculate a number of fixed transmission channels of the available transmission channels to facilitate the transmitting,
initiate the transmission of data from the first data storage node to the second data storage node through the fixed transmission channels,
detect a presence of remaining data in the first data storage node to be transmitted to the second data storage node,
randomly select a number of random transmission channels of the available transmission channels to transmit the remaining data, and
transmit the remaining data to the second data storage node via one or more of the randomly selected random transmission channels; wherein the processor is further configured to:
calculate a number of fixed transmission channels of the available transmission channels to facilitate the transmitting;
initiate the transmission of data from the first data storage node to the second data storage node through the fixed transmission channels;
detect a presence of remaining data in the first data storage node to be transmitted to the second data storage node;
randomly select a number of random transmission channels of the available transmission channels to transmit the remaining data; and
transmit the remaining data to the second data storage node via one or more of the randomly selected random transmission channels.

16. The data storage system of claim 15, further comprising:
a random number generator configured to randomly select the number of random transmission channels, wherein the processor is further configured to transmit the remaining data using at least one random transmission channel.

17. The data storage system of claim 15, wherein the processor is further configured to:
assign a life cycle to each of the randomly selected ones of the random transmission channels.

18. The data storage system of claim 17, wherein the first data storage node or the second data storage node is further configured to:
release the at least one random transmission channel after expiration of the life cycle thereof, or after completion of transmission of the remaining data.

19. The data storage system of claim 18, wherein the first data storage node or the second data storage node is further configured to:
select another random transmission channel for completing the transmission of the remaining data upon expiration of the life cycle of the at least one random transmission channel when there is remaining data to be transferred.

* * * * *

UNITED STATES PATENT AND TRADEMARK OFFICE
CERTIFICATE OF CORRECTION

PATENT NO. : 9,444,891 B2
APPLICATION NO. : 14/363075
DATED : September 13, 2016
INVENTOR(S) : Xu et al.

Page 1 of 1

It is certified that error appears in the above-identified patent and that said Letters Patent is hereby corrected as shown below:

On the Title Page

In Column 1, in Item (73), under "Assignee", Line 1, delete "Emoire" and insert -- Empire --, therefor.

Signed and Sealed this
Twenty-seventh Day of February, 2018

Andrei Iancu
*Director of the United States Patent and Trademark Office*